David H. Mooney Jr.,
INVENTOR.

David H. Mooney Jr.,
INVENTOR.

United States Patent Office 3,412,396
Patented Nov. 19, 1968

3,412,396
RECEIVER MECHANIZATION FOR APERTURE ADDED RADARS
David H. Mooney, Jr., Severna Park, Md., assignor, by mesne assignments, to the United States of America as represented by the Secretary of the Army
Filed Oct. 31, 1966, Ser. No. 591,006
9 Claims. (Cl. 343—5)

ABSTRACT OF THE DISCLOSURE

First and second mobile radar units each having a plurality of receiver channel chains each comprising a parametric amplifier connected to two mixers along with two different local oscillators so as to obtain two IF signals at the outputs of the mixers. The outputs of the mixers are fed through beam forming means and a matrix so as to provide signals on output wires of the radar system. A beam switch selects which set of receiver channel chains of back-to-back antennas is to be sent to filter delay lines, resistors, matrices, combining means, threshold means, and data processor to be processed.

---

Aperture adding is a technique disclosed by P. H. Pincoffs in his patent issued on Dec. 15, 1964, having Patent Number 3,161,870. This technique requires that the data from two or more radars be combined in each radar and processed thereby. Each of the radars will radiate at a different frequency, but each has receivers to receive all of the frequencies. This technique gives an improved range performance for a given transmitter power. However, this technique also presents added problems and complexities to the receivers of the radar units. This is further complicated by the requirement of each radar unit that it transmit at two different frequencies to provide frequency hopping. The transmitters of the radar units must be synchronized with respect to timing and frequency. The receiver must contain dual-frequency channels; switching means for coverage control; means for simultaneously deriving angle, range, and Doppler data; and means for low-noise reception.

It is, therefore, an object of the invention to provide a suitable receiver for use in an aperture adding radar system.

A further object of the present invention is to provide a receiver which will receive all the transmitted frequencies.

A still further object of this invention is the provision of a receiver in an aperture adding radar system which will simultaneously derive angle, range, and Doppler data.

Figure 1:
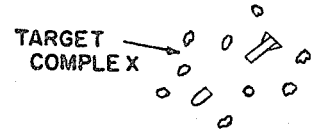
Figure 1:
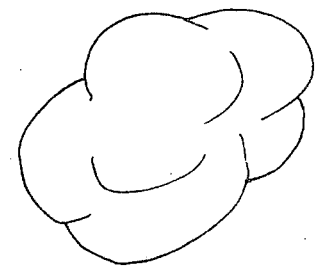
Figure 1:
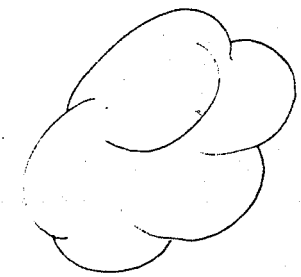
Figure 1:
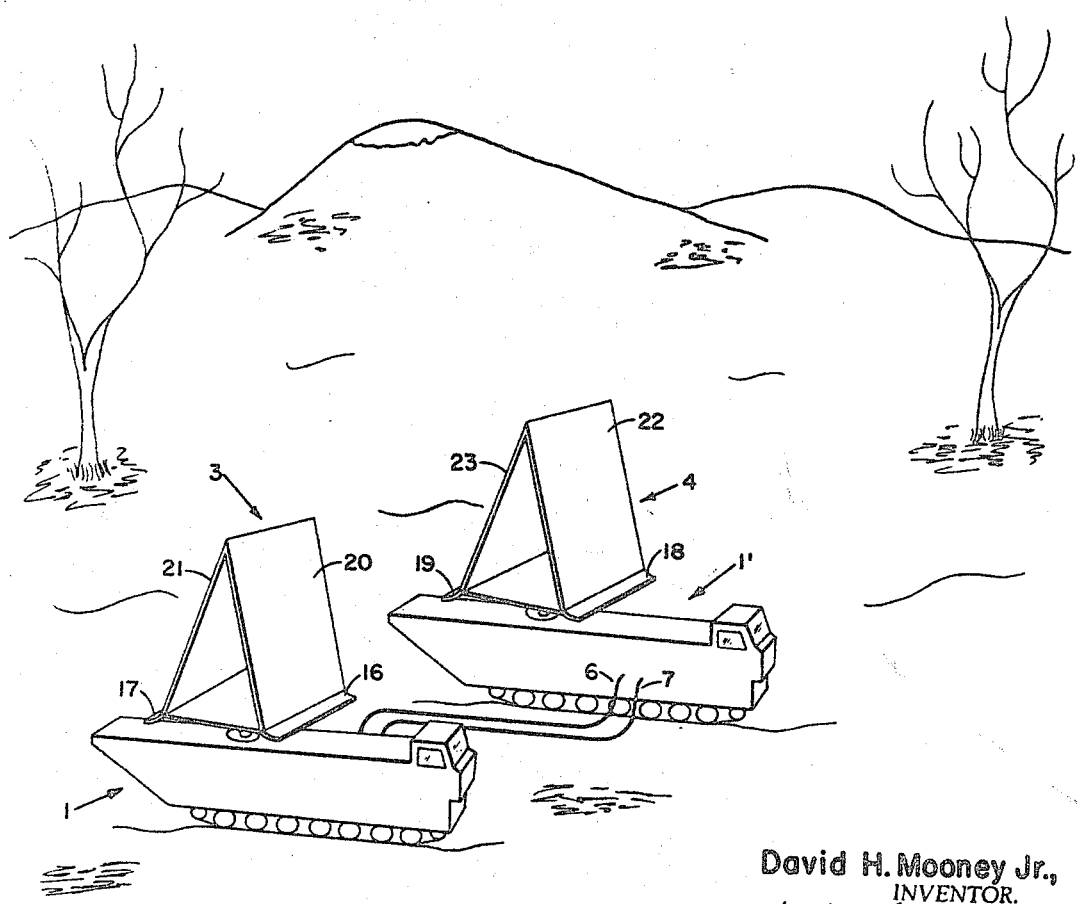
Figure 2:
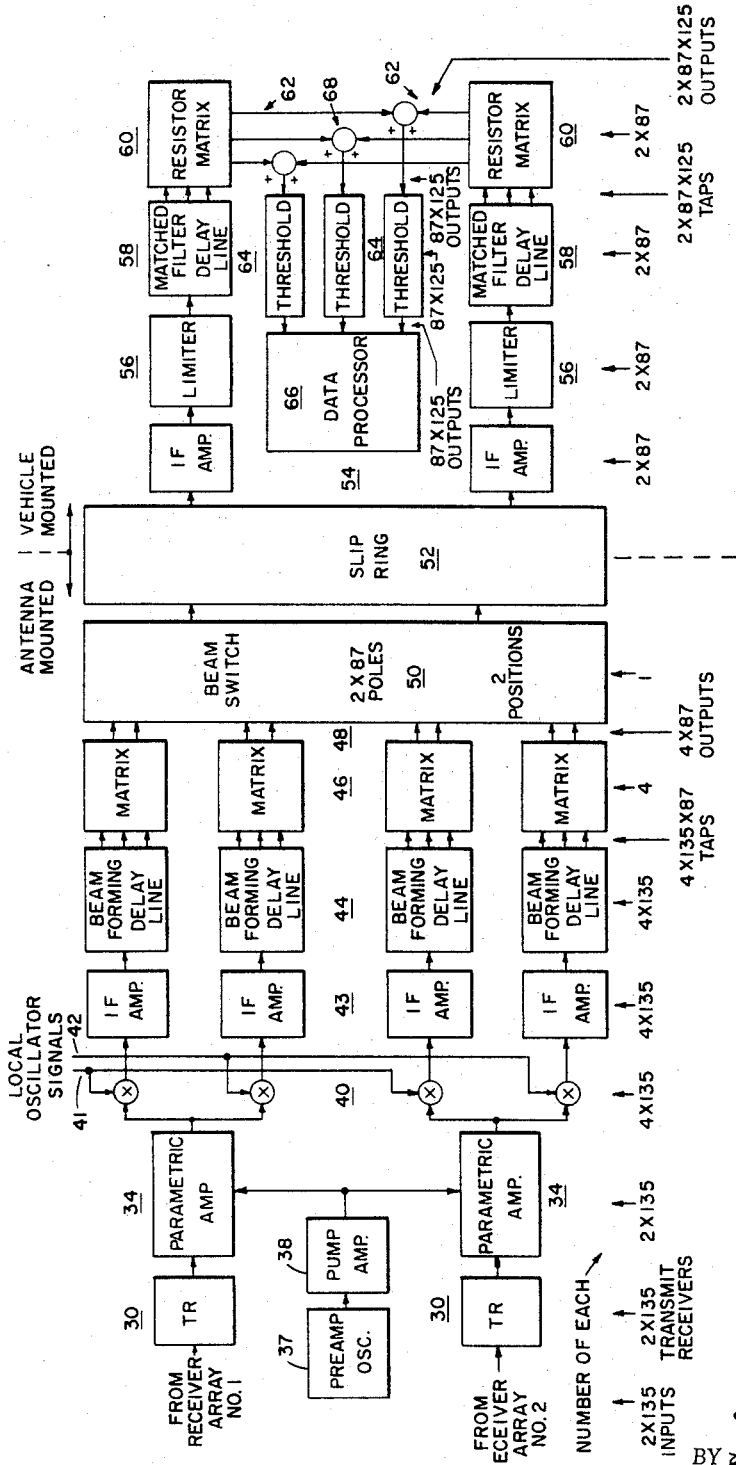

The various features of novelty which characterize this invention are poined out with particularity in the claims annexed to and forming a part of this specification. For a better understanding of the invention, however, its advantages and specific objects obtained with its use, reference should be had to the accompanying drawing and descriptive matter in which is illustrated and described a preferred embodiment of the invention, and in which:

FIGURE 1 is a diagrammatic representation of the overall search radar system in which the present invention is contained, and FIGURE 2 shows a block diagram illustrating a preferred form of the invention.

The overall search radar complex is shown in FIGURE 1. The primary function of the search radar complex is the initial detection of an approaching target complex (consisting of the warhead and the accompanying fragments, plus any decoys). The system normally consists of two identical search radar vehicles 1 and 1', having their antennas 3 and 4 mounted for rotation. The vehicles are located several hundred feet apart and are interconnected by low frequency cables 6 and 7. These radar vehicles act as a team normal circumstances, however, when desired or necessary, a single vehicle can perform all the search functions with reduced range performance. This arrangement provides the highly desirable feature of slow death.

The transmitter for each vehicle is a coherent master-oscillator power amplifier type, incorporating a phase-coded pulse compression transmission. Also, phase-to-pulse frequency hopping is provided by the transmitter. The pulse repetition frequency is kept low enough so that true range is obtained directly, and the pulse width is sufficiently great so that Doppler can be obtained from a single pulse return. The transmit antennas are shown in FIGURE 1 as being mounted back-to-back on the vehicles 1 and 1'. They will transmit a fan pattern having its thin dimension in azimuth. Transmitting arrays 16 and 17 are mounted on vehicle 1, and transmitting arrays 18 and 19 are mounted on vehicle 1'. The transmitter emits 450 $\mu$second phase-coded pulses, with segments of 3.6 $\mu$seconds each, which alternates pulse-to-pulse between two RF frequencies.

The receiver antennas are two plane-arrays mounted back-to-back on the vehicles. Receiver arrays 20 and 21 are mounted on vehicle 1, and receiver arrays 22 and 23 are mounted on vehicle 1'. The antennas are mechanically scanned in azimuth. The receivers are to form a stacked set of 87 pencil beams which are formed in elevation.

The receiver system is made up of a number of identical channels, as shown in FIGURE 2, such that all elevation angles and velocities (also ranges) are observed simultaneously. The narrow elevation beams are not formed until after RF and IF amplification; therefore there is not always an integer correspondence between the number of beams and the number of receiver blocks. For example, while there are 87 elevation beams, there are 135 TR tubes and parametric amplifiers (per array) as the first receiver stages, since there must be one for each row of elements in the array. The TR tubes 30 are necessary for prevention of burnout of the sensitive parametric amplifiers 34 due to both the local radar transmitter and the nearby second radar. The parametric amplifiers are a very important part of the receiver, for since they are the first stages, they essentially establish the receiver noise temperature (or noise figure). They must have a bandwidth of typically 200 mc. in order to accommodate the multi-frequency signals which are transmitted. Power is provided for the parametric amplifiers by preamplifier oscillator 37 and pump amplifier 38.

The output from each parametric amplifier is connected to two of the superhetrodyne receivers 40. These have different local oscillator signals 41, 42, one having the hopped frequencies $f_1$ and $f_2$ of the radar transmitter in a first vehicle and the other having the hopped frequencies $f_3$ and $f_4$ of the transmitted signal of the second vehicle. The IF amplifiers 43 are connected to the outputs of mixers 40. These amplifiers are all identical and provide sufficient gain so that the beam-forming operation need not be done at critically small levels.

The output of each IF amplifier 43 is fed to one of the tapped IF beam forming delay lines 44. Matrices 46 of weighting resistors appropriately sums across all delay lines to form the 87 elevation pencil beams. The output wires 48 of the matrices identify the position of the target by which wire an output signal occurs as each matrix corresponds to a particular pencil beam. However, matrices 46 will each have two output wires. This is due to the fact that there is one output for each of the two received frequencies ($f_1$ and $f_3$, or $F_2$ and $F_4$).

This brings one to the beam switch 50 which determines which receiver array will be connected for processing by the data processor. In order to better understand the function of beam switch 50, reference to the manner in which the transmitter sends its signal should be made. The output of the transmitter is sent to a further beam switch (not shown) which is mounted on the antenna of a vehicle. Considering vehicle 1 of FIGURE 1, as antenna 3 is rotated mechanically, the transmitter beam switch will alternately connect the output of the transmitter to transmitting antennas 16 and 17. This switch will change connections every 180° of azimuth. By so doing this allows scanning of ½ of the horizon without the need of oscillating the antenna or having the scan time be discontinuous. If whole horizon scan is desired, the beam switch can be locked so that it will not switch: therefore only one antenna array will transmit and it will transmit for the full 360°. Beam switch 50 of FIGURE 2 is made to correspond in function with the transmitter beam switch, by only connecting the receiver array, on the same face of the antenna as that of the transmitting array, to the data processor. Beam switch 50 is a 174-pole, two position switch which is operated by rotation of the antenna.

A slip ring assembly 52 couples the resulting 174 outputs of the beam switch to the base of the vehicle, where the rest of the receiver circuits and the data processor are located. The output of the beam switch is the first point in the receiver chain in which a minimum number of slip rings can be used. The output from the slip rings is further amplified by IF amplifiers 54 and sent to hard limiters 56. The hard limiting makes a constant false alarm rate system which automatically compensates for changes in receiver gain or in noise level due to jamming. Thus, saturation of a central digital computing system (not shown) is prevented. This is done at a very small loss in the signal/noise ratio.

A delay-line version 58 of a matched filter bank is used in the output of each receiver and consists of a 450 $\mu$second tapped IF delay line. The taps are spaced at 3.6 $\mu$seconds and are each coded in polarity exactly the opposite of the coding line in the transmitter (not shown). As is known, when a coded signal just fills the delay line, maximum output is obtained. When the signal only partly fills the line, a level of about 20 db less is obtained. This lower level is known as "range side-lobes" due to their similarity to antenna side lobes. Of course, when the signal falls completely out of the line, no output at all occurs.

The above description assumes no Doppler shift. Since there will be Doppler, the signal will not exactly match the delay line. To correct for the Doppler, a simple arrangement of resistor weighting matrices 60 which sums across all taps is used to match any desired Doppler. The result is that each matched filter line matrix has a wire output corresponding to each Doppler region of interest. The equivalent filter bandwidth of each output is the reciprocal of the total pulse width, or 2.2 kc. for this embodiment. Since each filter has a rounded frequency response, it is desirable to overlay these an appreciable amount to prevent excessive degradation on signals with a Doppler shift halfway between filters. Consequently, the spacing has been chosen to be 1.1 kc. or a half-bandwidth. Since the total Doppler region of interest is about 130 kc. (corresponding to 12,000 ft./sec.) there will be 125 output wires to indicate velocity from each of the 174 receivers, or a total of 21,750 wires.

Obviously, a very large number of resistors and wires are required in this portion of the receivers. These are, however, very amenable to advanced high-density packaging techniques because of the low power, high basic reliability (due to lack of active elements), great redundance, and identical nature of the channels.

The appearance of the signal on one of the output wires 62 will be a pulse of about 3.6 $\mu$seconds duration, with the aforementioned low-level range side-lobes extending 450 $\mu$seconds before and after the major lobe. The time delay between the transmitted pulse and this pulse indicates the true range to the target.

Because of the aperture-adding feature, the two receiver sets are simultaneously receiving target echoes at the RF frequencies of the second radar as well as that of the local radar. It is desired to non-coherently sum these two sets of receiver output, following detection, to improve the signal/noise ratio. The two RF transmissions were at different frequencies. This will cause slightly different Doppler frequencies for the same target. This effect can be cancelled, however, so that a wire-to-wire addition between filter bank outputs can be readily attained. This is made easier due to the fact that the transmitted frequencies of the two radars are separated by a fixed known frequency. By adjusting the Doppler spacing for the receiver filter banks in the second set for this percentage difference, a target will appear on the same wire in both receiver sets. Simple resistor adding then effects the desired result, and the number of outputs is halved. The time of occurrence of the two signals will be within 1 $\mu$second of each other, since the two radars are within 500 feet separation; therefore direct adding is satisfactory regardless of azimuth pointing angle.

The final step ahead of the digital data processor is the thresholding of the data by thresholds 64. A separate threshold in each of the 10,875 wires is used for this purpose. These thresholds are set to correspond to a high false alarm rate at this point, since these will be reduced considerably by scan-to-scan correlation in the digital data processor 66. The data processor processes the returns and sends information about any target detected to a central computer (not shown).

The overall operation of the receiver is as follows: The antenna arrays receive echo returns which may or may not be returns from a target complex. The returns are sent to parametric amplifiers 34 by way of TR tubes 30. The outputs of the amplifiers 34 are heterodyned with the local oscillator signals in mixers 40. This reduces the returns to IF, and the IF is amplified and sent to beam forming delay lines 44 and matrices 46 where the stacked set of pencil beams is formed in elevation. Matrices 46 form output wires for the position of the target. Beam switch 50 then selects the signals from either array No. 1 or No. 2 to be sent to slip ring 52. The output from slip ring 52 is amplified and sent to limiters 56 where they are given a constant false alarm rate. The output of the limiters are sent through matched filter delay lines 58 and resistor matrix 60 where the velocity as well as the location of the target in the stack is indicated by which output wire 62 it is on. The range is indicated by the time of the return. Separate determinations of location and range are made in the receiver by duplication of parts, however at this point these determinations may be combined by simple addition of corresponding output wires by adders 68. The output of the adders are sent through threshold means 64 to the data processor for processing.

While the invention has been described with reference to a preferred embodiment thereof, it will be apparent that various modifications and other embodiments thereof will occur to those skilled in the art within the scope of the invention. Accordingly, I desire the scope of my invention to be limited only by the appended claims.

I claim:

1. A receiver system for deriving information from an input signal received by its antenna comprising a plurality of receiver channel chains each comprising a first signal detecting means for detecting said input signal, first and second mixer means, said detecting means having an output connected to a first input of each of said first and second mixer means, first and second oscillator signal means connected to second inputs of the first and second mixer means respectively, and first and second output wires connected to outputs of said first and second mixer means respectively; a combining circuit connected to the output wires of each channel chain for summing any signals on said output wires; and connection means connecting the output of the combining circuit to a utilization means.

2. A receiver system as set forth in claim 1, wherein each channel chain further contains first and second beam forming means and first and second matrix means which are connected between the outputs of said first and second mixer means, respectively, and said output wires; whereby a channel chain will have an output only when the input signal has a predetermined direction; and said predetermined direction being different for each channel chain.

3. A receiver system as set forth in claim 2, wherein each channel chain further contains a plurality of matched filter delay line means individually connected between outputs of the matrix means and said combining circuit.

4. A receiver system as set forth in claim 3, wherein said oscillator signal means are each hopped in frequency.

5. A receiver system as set forth in claim 2, further containing another antenna having a plurality of other receiver channel chains which have further output wires, and switch means connected to the output wires of all channel chains whereby one set of output wires is selectively connected to the combining circuit.

6. A receiver system as set forth in claim 5, further including a plurality of matched filter delay line means individually connected between outputs of said switch means and said combining circuit.

7. A receiver system as set forth in claim 6, wherein said oscillator signal means are each hopped in frequency.

8. A receiver system as set forth in claim 7, further including a plurality of resistor matrices connected between the outputs of said matched filter delay line means and said combining circuit, whereby compensation for Doppler shift can be made.

9. A receiver system as set forth in claim 8, further comprising a rotatable back-to-back antenna mount, a mobile vehicle, said switch means and all components before the switch means are mounted on said rotatable back-to-back antenna mount, all other components of the system being mounted on said mobile vehicle, and a slip ring assembly connecting the outputs of said switch means to inputs of said matched filter delay line means.

References Cited
UNITED STATES PATENTS

| | | | |
|---|---|---|---|
| 3,161,870 | 12/1964 | Pincoffs | 343—5 |
| 3,308,456 | 3/1967 | Levenson et al. | 343—5 |
| 3,345,631 | 10/1967 | Chamberlin | 343—100.6 |

RODNEY D. BENNETT, *Primary Examiner.*

C. L. WHITHAM, *Assistant Examiner.*